United States Patent [19]

Bauer

[11] 4,402,581

[45] Sep. 6, 1983

[54] CLAW FEED MECHANISM

[76] Inventor: Fritz Bauer, Loquaiplatz 13/26, Vienna, Austria, A-1010

[21] Appl. No.: 430,422

[22] Filed: Sep. 30, 1982

Related U.S. Application Data

[63] Continuation of Ser. No. 196,972, Oct. 14, 1980, abandoned.

[30] Foreign Application Priority Data

Jan. 4, 1980 [AT] Austria ................................. 39/80

[51] Int. Cl.$^3$ ................................................ G03B 1/22
[52] U.S. Cl. ...................................... 352/192; 226/62
[58] Field of Search ............... 352/191, 192, 193, 194; 226/62, 67, 68

[56] References Cited

U.S. PATENT DOCUMENTS

| 714,845 | 12/1902 | White .................................. 352/193 |
| 1,850,411 | 3/1932 | Mitchell . |
| 1,850,955 | 3/1932 | Fear . |
| 1,930,723 | 10/1933 | Mitchell . |
| 1,954,885 | 4/1934 | Mitchell et al. . |
| 2,124,322 | 7/1938 | Tondreau . |
| 2,179,630 | 11/1939 | Hillman . |
| 2,475,099 | 7/1949 | Jonson . |
| 3,587,960 | 6/1971 | Gerb . |

FOREIGN PATENT DOCUMENTS

| 367522 | 8/1921 | Fed. Rep. of Germany ...... 352/193 |
| 1285868 | 12/1968 | Fed. Rep. of Germany . |
| 1478399 | 3/1967 | France . |
| 21787 | of 1908 | United Kingdom ................ 352/193 |
| 378546 | 9/1932 | United Kingdom . |
| 796516 | 6/1958 | United Kingdom . |

Primary Examiner—Monroe H. Hayes
Attorney, Agent, or Firm—Blum, Kaplan, Friedman, Silberman & Beran

[57] ABSTRACT

A claw feed mechanism for a motion picture camera for intermittently advancing film for exposure. A first end of an elongated, light-weight film feeding pin is pivotally coupled to a first crank. The film feeding pin includes an advancing taper at the second end thereof for engaging with and advancing the film. A second crank includes a guide for guiding the film feeding pin. The first and second cranks are mutually eccentrically driven so that the film feeder pin reciprocates with respect to the guide, while the film feeder pin and the guide synchronously pivot so that the advancing taper on the film feeder pin defines an elliptical path thereby intermittently engaging with and advancing the film for exposure.

10 Claims, 9 Drawing Figures

CLAW FEED MECHANISM

This is a continuation of application Ser. No. 196,972, filed Oct. 14, 1980, now abandoned.

BACKGROUND OF THE INVENTION

This invention relates generally to a claw feed mechanism for a motion picture camera, and, in particular, to a claw feed mechanism for a motion picture camera which incorporates lighter, more easily moveable film feeder pins having advancing prongs for intermittently advancing film whereby the noise produced by the claw feed mechanism is reduced.

The conventional claw feed mechanism generally includes relatively large film feeder arms and film holding arms. The film feeder arms are adapted to intermittently advance consecutive frames of the movie film for exposure by engagement with perforations along the edge of the film. The film holding arms are adapted to intermittently stop the advancement of the film by engaging perforated openings along the edge of the film so that each consecutive frame can be properly exposed.

The claw feed mechanism in a motion picture camera is adapted to intermittently advance the film so that each frame is consecutively exposed through the photographic optics (lenses) of the camera. It is necessary that such a system be highly precise in positioning and holding each consecutive frame of the film for exposure so that a high quality film is produced. Where the film is adapted to be used with a sound track, it is imperative that any noise eminating from the interior of the camera be kept to an absolute minimum.

A major disadvantage of prior art claw feed systems is that relatively large, massive film feeder arms and film holding arms are required for proper construction of the systems. Since the film feeder arms and film holding arms are relatively large and massive, a large driving energy is necessary to move these arms. Also, since the claw feed mechanism of a motion picture camera must be precisely constructed for producing high quality motion picture films, high technical precision in manufacture is called for. The relatively large, massive film feeding arms and film holding arms of the prior art make such high technical precision even more difficult to achieve. Additionally, the prior art claw feed systems produce substantial noise in operation, which noise is often transmitted to the sound track on the film thereby rendering such prior art systems less that completely satisfactory.

Accordingly, an improved claw feed mechanism in which the size and weight of the film feeder arms and the film holding arms are substantially reduced for minimizing the noise produced and which admits of the high precision necessary for making high quality motion pictures, is desired.

SUMMARY OF THE INVENTION

Generally speaking, in accordance with the instant invention, a claw feed mechanism for a motion picture camera for intermittently advancing consecutive frames of the motion picture film for exposure, is provided. A film feeding pin is pivotally coupled to a first crank. The film feeding pin includes an advancing prong at an end thereof for engaging with and advancing the film. A second crank includes a guide for guiding the film feeding pin. The first and second cranks are mutually, eccentrically driven by a driving mechanism so that the film feeder pin reciprocates in the guide while the film feeder pin and the guide synchronously pivot so that the advancing prong on the film feeder pin defines an elliptical path, thereby intermittently engaging with and advancing the film.

In an exemplary embodiment, two film feeding pins in spaced relation are provided. The advancing prongs thereon engage opposing perforated openings along the edge of the film. The claw feed mechanism of the instant invention can include a third crank guide having a pilot pin which is pivotally coupled to the driving mechanism for horizontally reciprocating so that the pilot pin intermittently engages with film edge perforated openings and holds the film in place for proper exposure.

Accordingly, it is an object of the instant invention to provide an improved claw feed mechanism for a motion picture camera.

Another object of the instant invention is to provide a claw feed mechanism for a motion picture camera which includes lighter and smaller film feeding pins for intermittently advancing the film.

A further object of the instant invention is to provide a quieter claw feed mechanism for a motion picture camera.

A still further object of the instant invention is to provide a claw feed mechanism for a motion picture camera which requires less driving energy to operate.

Yet another object of the instant invention is to provide a claw feed mechanism for a motion picture camera in which high precision in manufacture is easily achieved.

Still other objects and advantages of the invention will in part be obvious and will in part be apparent from the specification.

The invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
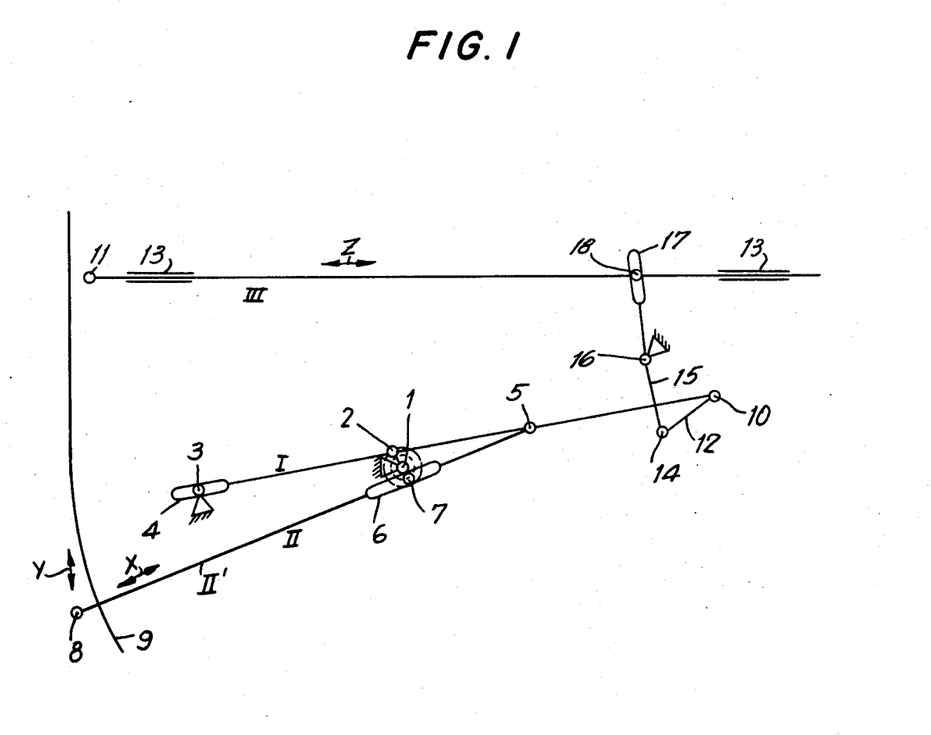
FIG. 1 is a kinematic diagram illustrating the mechanical operation of a claw feed mechanism.

Referring first to FIG. 1, a kinematic diagram depicting the mechanical operation of a conventional claw feed mechanism, as well as the claw feed mechanism of the instant invention, is depicted. The film feeder system includes two mutually controlled pivoting crank guides I and II. Crank guide I is put into motion by means of a crank 2 eccentrically positioned on a drive shaft 1, and is guided at stationary point 3 in guiding loop 4. Thus, all points along crank guide I, except the point where crank 2 is coupled to crank guide I and stationary point 3, define elliptical paths when crank guide I is in motion. Crank guide II is pivotally coupled to crank guide I at fulcrum 5. Fulcrum 5 also defines an elliptical path when crank guide I is in motion.

Crank guide II includes a guiding loop 6 in a central portion of its rocking lever II'. Guiding loop 6 is driven by crank pin 7 which is also eccentrically positioned on drive shaft 1. It is noted that crank pin 7 defines a smaller radius with respect to the central axis of drive shaft 1 then does crank pin 2. It is also noted that cranks 2 and 7 are located 180° apart on either side of the central axis of drive shaft 1.

Crank guide II forms the film feeder defined by rocking lever II' which includes film advance prong 8 at one end thereof. Film advance prong 8 engages perforated openings (not shown) along peripheral edges of filmstrip 9. Crank guide II, by means of film advance prongs 8, is adapted to intermittently engage with the perforated openings along the peripheral edge of filmstrip 9 and to advance the film forward. Thereafter, film advance prong 8 will withdraw from the perforated openings in film 9 due to the mutual cooperation of crank guides I and II along with eccentrically located cranks 2 and 7.

A third crank guide III is pivotally coupled to crank guide I at fulcrum 10 by means of a drive lever system described in detail below. Crank guide III in combination with the drive lever system forms the pilot system of the claw feed mechanism. Crank guide III includes film holding prongs 11 at the end thereof which are adapted to intermittently engage with the perforated openings along the edges of filmstrip 9 at the time when film advance prongs 8 withdraw from the perforated opening in filmstrip 9. Pilot prongs 11, when they engage with perforated openings in filmstrip 9, hold filmstrip 9 stationary so that a frame on the filmstrip 9 can be properly exposed through the lenses of the motion picture camera.

A drive lever system which drives crank guide III of the pilot system includes a piston rod 12 pivotally coupled at fulcrum 10 at the end of crank guide I. The length of piston rod 12 corresponds with the radius of the circle through which the part of the path of movement of point 10 on each side of an end point of the small axis of the elliptical path is approached. The other end 14 of piston rod 12 is pivotally coupled to a double lever 15. Double lever 15 includes a stationary fulcrum 16 intermediate the two ends thereof so that double lever 15 can pivot about stationary fulcrum 16. The other end of double lever 15 includes a guide loop 17 which is driven by double lever 15 as motion is transmitted to it by means of drive shaft 1. A crank pin 18 on crank guide III is adapted to ride in guide loop 17. Accordingly, as double lever 15 pivots about stationary fulcrum 16, crank guide 3 will reciprocate in a horizontal direction guided by guide channels 13. Thus, pilot prongs 11 will similarly reciprocate into and out of the perforations along the edge of filmstrip 9 thereby intermittently holding film 9 in a stationary position.

Crank 2 on drive shaft 1 in combination with crank guide I forms a first eccentric. Crank 7 on drive shaft 1 in combination with crank guide II forms a second eccentric. By pivotally coupling crank guides I and II at fulcrum 5, crank guide II is caused to reciprocate in the direction of arrow X and pivot at fulcrum 5 in the direction of arrow Y. Accordingly, the film feeder system allows crank guide II to advance into engagement with a perforated opening along the edge of filmstrip 9 whereafter crank guide 21 will move in a vertical direction so as to advance film 9 for exposure. Crank guide II will then withdraw from the perforated opening in filmstrip 9. At that time, crank guide III will be caused to horizontally reciprocate in the direction of arrow Z so as to engage with another perforated opening along the edge of filmstrip 9 to hold the film stationary for exposure. This process will be repeated intermittently as drive shaft 1 continues to rotate. In this manner, each consecutive frame on filmstrip 9 will be advanced by crank guide II, held stationary by crank guide III, exposed to light by means of the motion picture camera photographic optics and will then be advance again by crank guide II.

Figure 2:
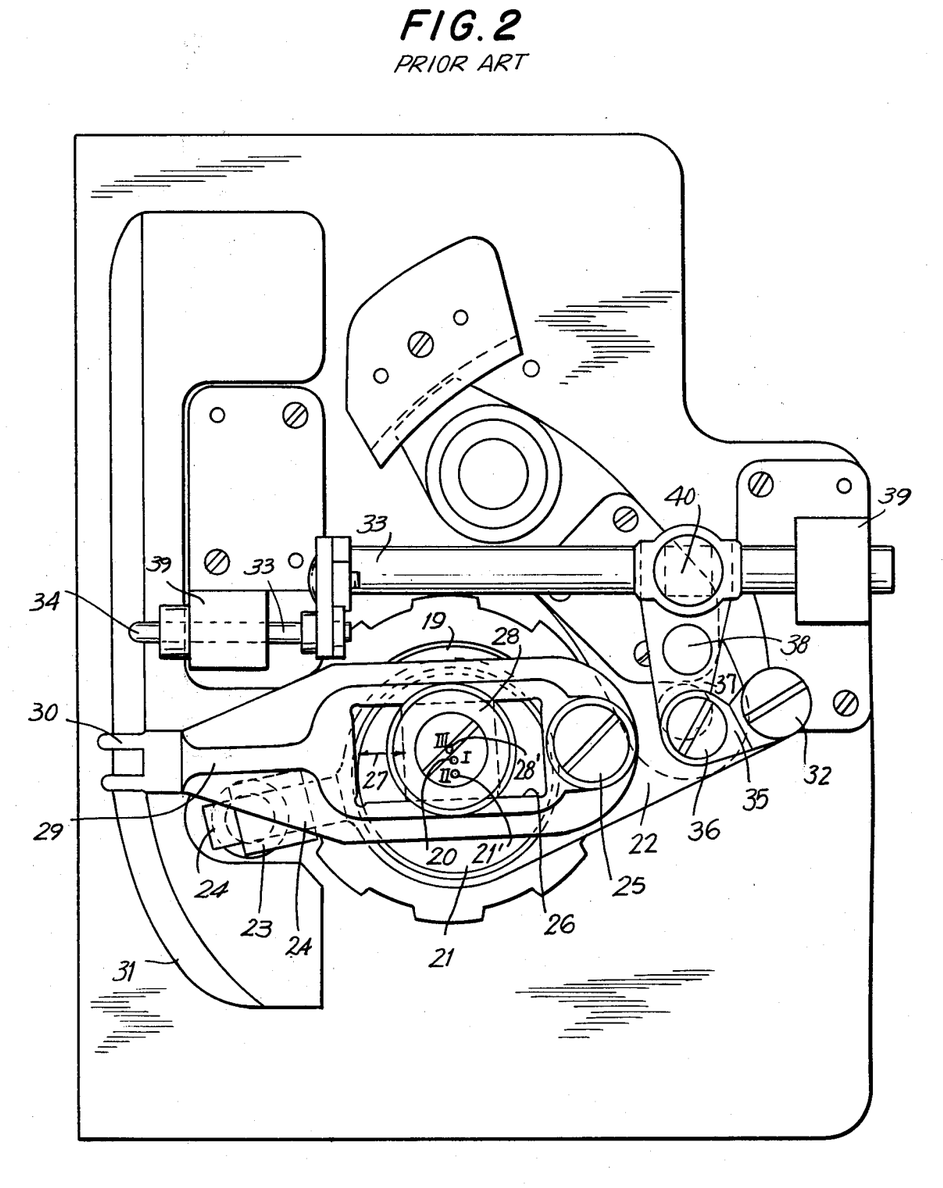
FIG. 2 is a side plan sectional view of a claw feed mechanism constructed in accordance with the prior art.
Figure 3:
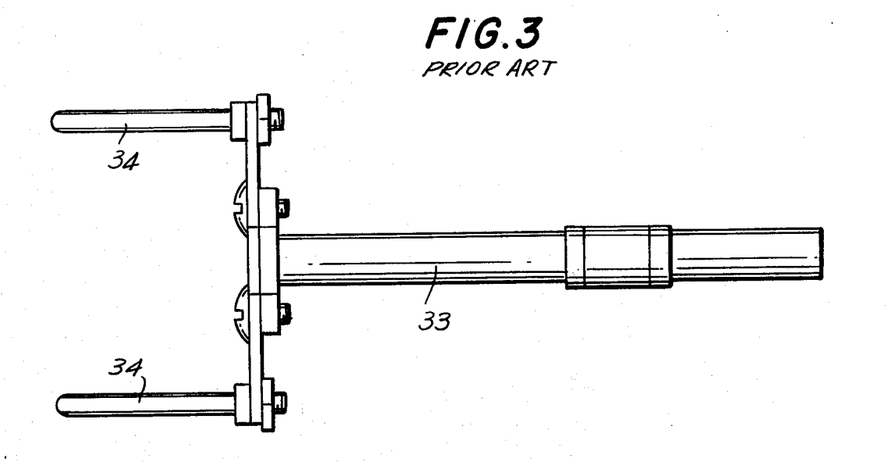
FIG. 3 is a top plan view of the pilot rod depicted in FIG. 2 constructed in accordance with the prior art.
Figure 4:
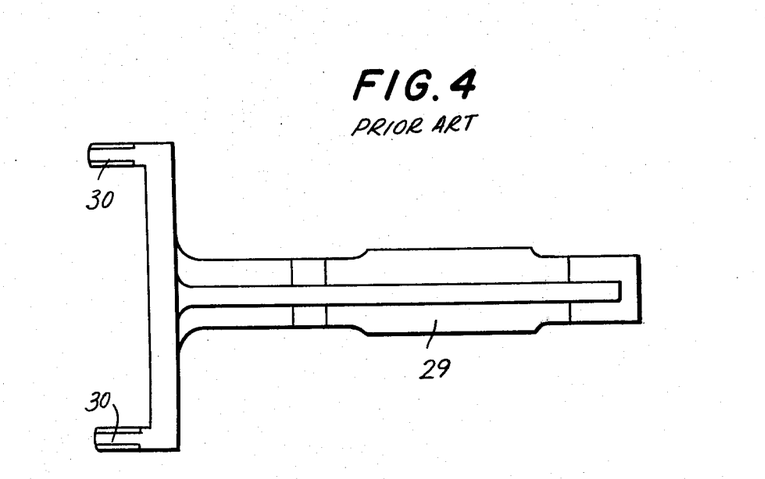
FIG. 4 is a top plan view of the film feeder arms depicted in FIG. 2 constructed in accordance with the prior art.

Referring now to FIGS. 2 through 4, a conventional claw feed system that operates in accordance with the aforedescribed principles and is constructed according to the Mitchel construction and utilized in the prior art Newall camera, is depicted. Crank guide I includes a rocker arm 22 and crank guide II includes a film feeder lever 29 having film advancing prongs 30. Crank guide III of the pilot system includes a piston rod 35, a double lever 37 and an offset pilot rod 33 having pilot prongs 34 at the end thereof.

Rocker arm 22 of crank guide I is driven by an eccentric 21 situated on driving shaft 19. Driving shaft 19 has a turning fulcrum indicated as 20 and eccentric 21 has a turning fulcrum shown as 21'. Guiding loop 4 depicted in FIG. 1 is formed in the conventional claw feed mechanism depicted in FIG. 2 by pivotable guide 23 adapted to receive a projection 24 of rocker arm 22. The moveable points along rocker arm 22, as well as the point at which a pivot bearing 25 is provided for coupling film feeder lever 29 to rocker arm 22, will describe elliptical paths as drive shaft 19 rotates. A central portion of film feeder lever 29 is provided with transport guide 26 for receiving sliding block 27. Transport guide 26 is driven by a second eccentric 28 having a turning fulcrum 28'. Eccentric 28 is seated together with eccentric 21 on drive shaft 19, both eccentrics being located off the central axis of drive shaft 19.

The end of film feeder lever 29 which is to advance the film is fork-shaped and includes two film advancement prongs 30. A film guide plate 31 includes slit-shaped openings the length of which corresponds with the vertical (FIG. 2) path taken by film advancement prongs 30. Film advancement prongs 30 are adapted to engage perforated openings along the edge of film 9 (not shown) for advancing film 9. Pilot rod 33 includes offset pilot prongs 34 which are adapted to engage with other perforated openings in the edge of film 9 so as to hold film 9 stationary so that consecutive frames on film 9 can be properly exposed.

Pilot rod 33 is coupled to sliding block bearing 40. Double lever 37 is also coupled to sliding block bearing 40, double lever 37 having a stationary fulcrum 38. The other end of double lever 37 is connected by means of pilot bearing 36 with piston rod 35. Piston rod 35 corresponds with piston rod 12 depicted in FIG. 1. Piston rod 35 of crank guide III is conncted with one end of rocker arm 22 by moveable pivot bearing 32. Stationary guide 39, through which pilot rod 33 extends, allows for the horizontal reciprocating motion of pilot rod 33. Perforated openings are included in the film guide plate 31 for allowing pilot prongs 34 to reciprocate therethrough and intermittently engage with the perforated openings on the edge of filmstrip 9.

As depicted in FIGS. 3 and 4, film holding arm or pilot rod 33 and film feeder lever 29 of the conventional claw feed mechanism are relatively large, massive movable arms. Accordingly, a substantial amount of noise is generated by the conventional claw feed mechanism utilizing these relatively large, massive arms. Also, due to the size and weight of pilot rod 33 and film feeder lever 29, a relatively large driving energy is required to drive these components.

Reference is now made to FIGS. 5 through 9 wherein a claw feed mechanism, constructed in accordance with the instant invention, is depicted. Crank guide I as depicted in FIG. 1 includes a rocker arm 52. Crank guide II as depicted in FIG. 1 includes a film feeder rocker 68 which acts as a guiding piece for two elongated, single film feeder pins 56. The pilot system, which includes crank guide III depicted in FIG. 1, includes a piston rod 63, a double lever 65 a piston member 67 and two elongated, guided single pilot pins 62. Rocker arm 52 is driven by an eccentric 51 eccentrically arranged on drive shaft 50. A first end of rocker arm 52 tapers into a rod 54 which is pivotable in a swiveling guide 53. Swiveling guide 53 is pivotally coupled to claw feed housing 74. Swiveling guide 53 acts as guide loop 4 depicted in FIG. 1. Each non-stationary point of rocker arm 52 defines an elliptical path when rocker arm 52 is in motion. Additionally, those points of rocker arm 52 at which pivot bearings 55 and 61 are arranged similarly define elliptical paths upon movement.

Figure 5:
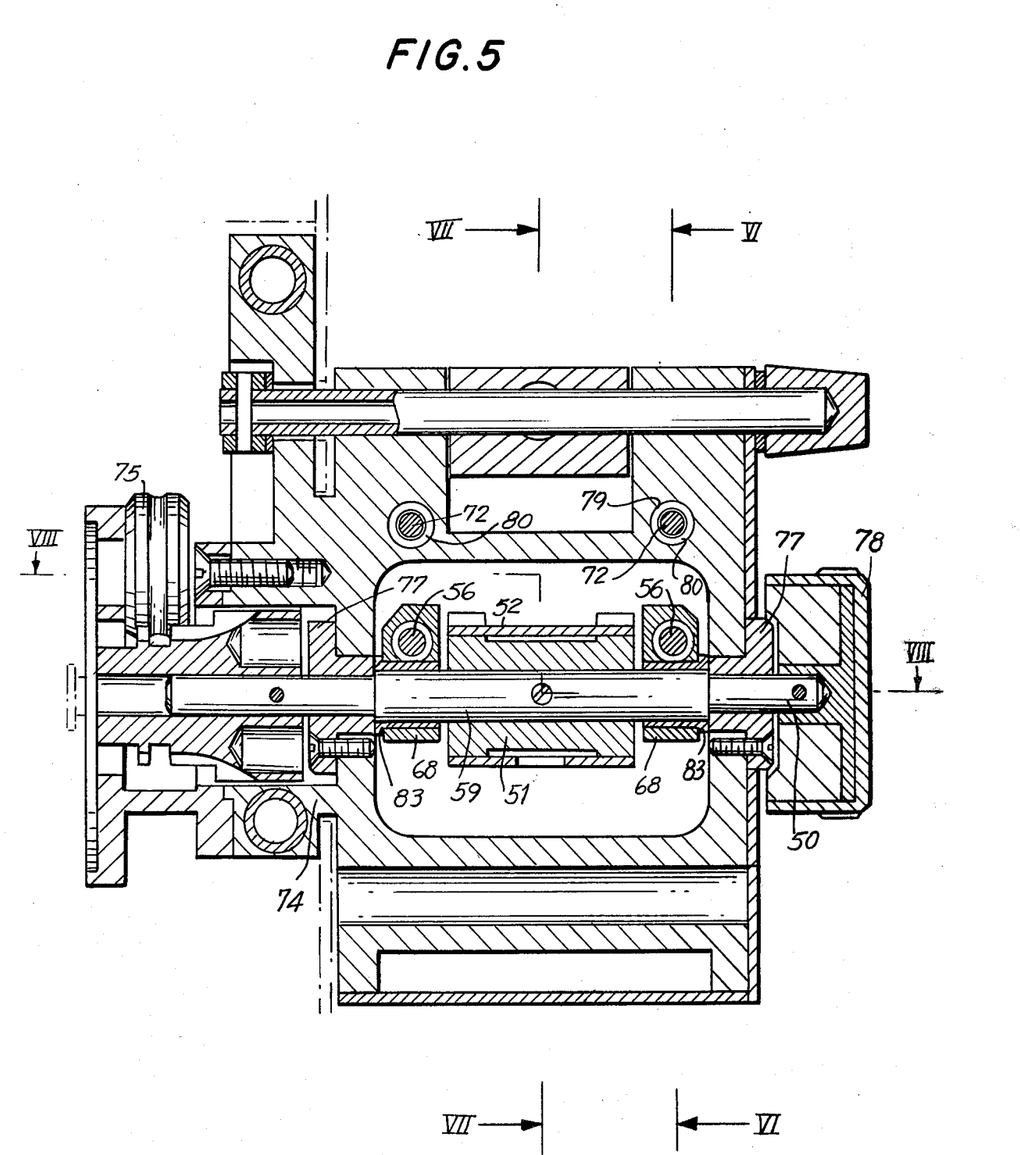
FIG. 5 is a front plan sectional view of a claw feed mechanism constructed in accordance with the instant invention, also depicted as a sectional view taken along line V—V of FIG. 7.

Pivot bearing 55 includes an axle 69 fixedly connected to rocker arm 52. A film feeder single pin 56 is pivotally coupled at each end of axle 69 by means of a bearing eye 87. Each film feeder single pin tapers into a film advancement prong 57 which engage with perforated openings along the edge of film 9 as film 9 rides along film guide plate 60. The longitudinal extent of each film feeder single pin 56 approximately corresponds with the longitudinal extent of rocker arm 52. Single pins 56 are each guided in a film feeder rocker 68. Film feeder rocker 68 includes a tube-shaped guide 70 for receiving one pin 56 therein. The two tube-shaped guides 70 are connected with one another by a bar 71 including an opening 85 therein. The ends of tube-shaped guides 70 include sliding sleeves 58 for slidingly receiving film feeder single pins 65. The length of elongated openings 76 in film guide plate 60 corresponds with the transport path of the film feeder advancement prong 57.

As aforenoted, rocker arm 52 is driven by eccentric 51 on drive shaft 50. A second eccentric 59 is provided on drive shaft 50 for driving film feeder rocker 68. Eccentric 59 consists of a shaft eccentrically arranged on drive shaft 50. The degree of offset of center line 59' of eccentric 59 from center line 50' of drive shaft 50 is illustrated at arrow B in FIG. 6. Similarly, the degree of offset of the center line 51' of eccentric 59 from center line 50' of drive shaft 50 is shown at arrow A in FIG. 6.

Film feeder rocker 68 is rotatably attached to eccentric 59 by means of bearing sleeve 83. Driving shaft 50 is rotatably supported in bearings 77 on claw feed mechanism housing 74. The driving mechanism is placed at one end of drive shaft 50. The driving mechanism can be either a direct drive or a transmission drive mechanism. For example, a driving disc 75 can be included in the driving system for driving drive shaft 50. An operation or adjusting knob 78 can be coupled to the other end of drive shaft 50 for adjusting the speed of drive shaft 50.

Figure 6:
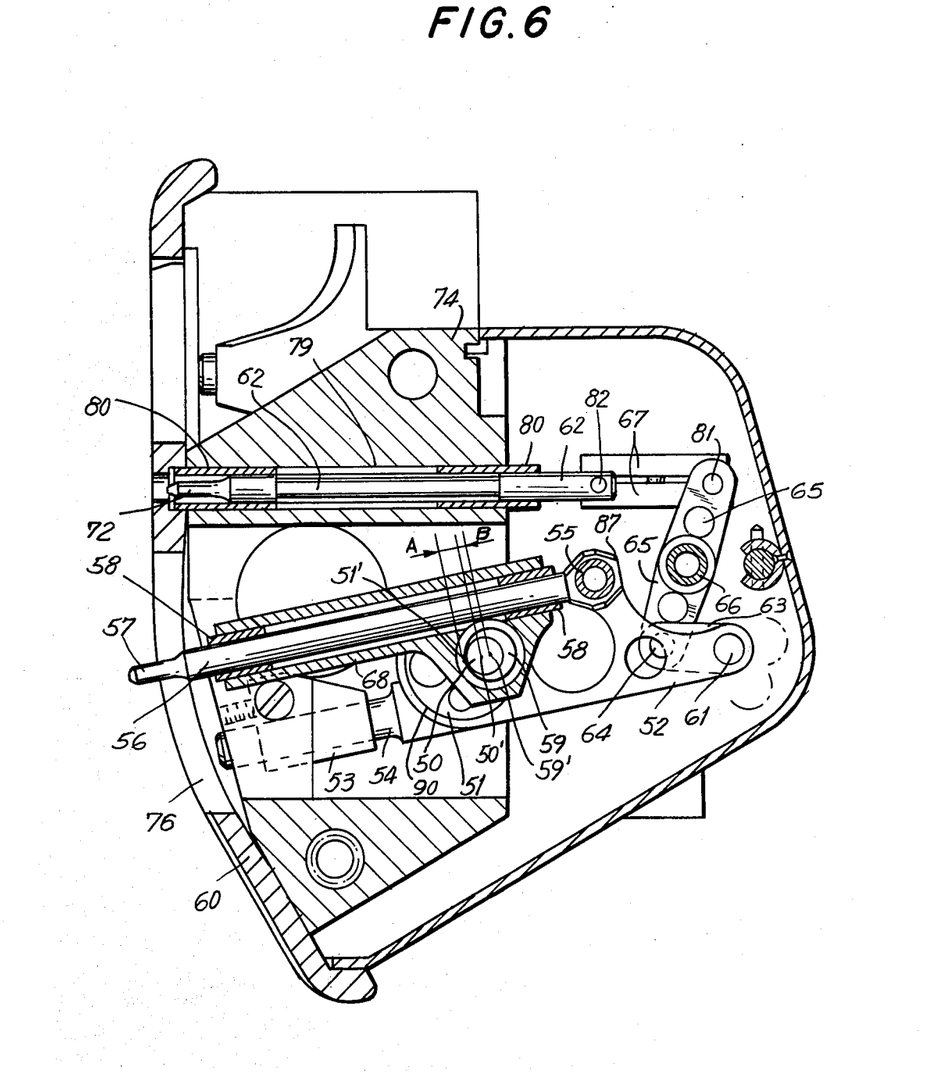
FIG. 6 is a sectional view taken along line VI—VI of FIG. 5.
Figure 7:
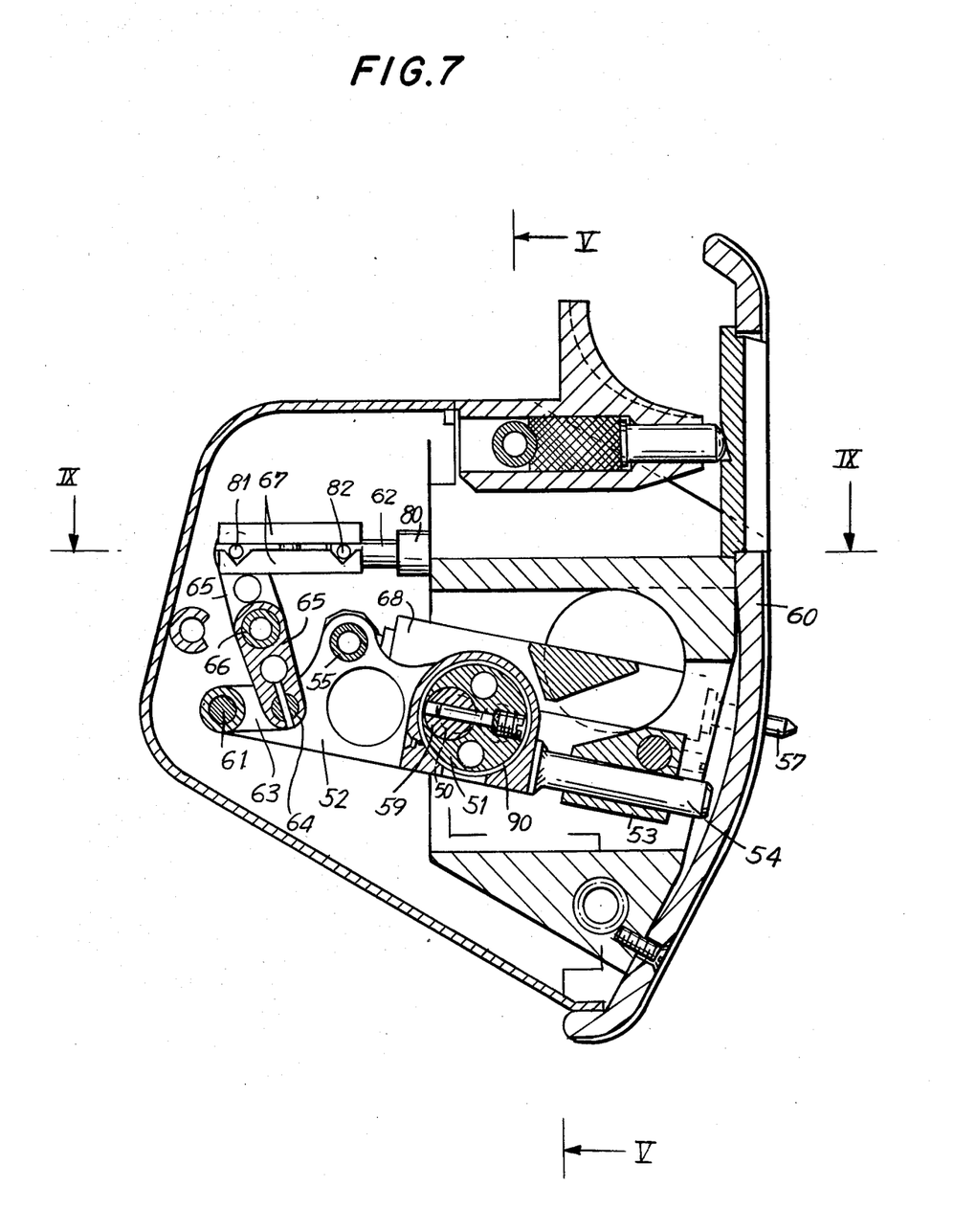
FIG. 7 is a sectional view taken along line VII—VII of FIG. 5.
Figure 8:
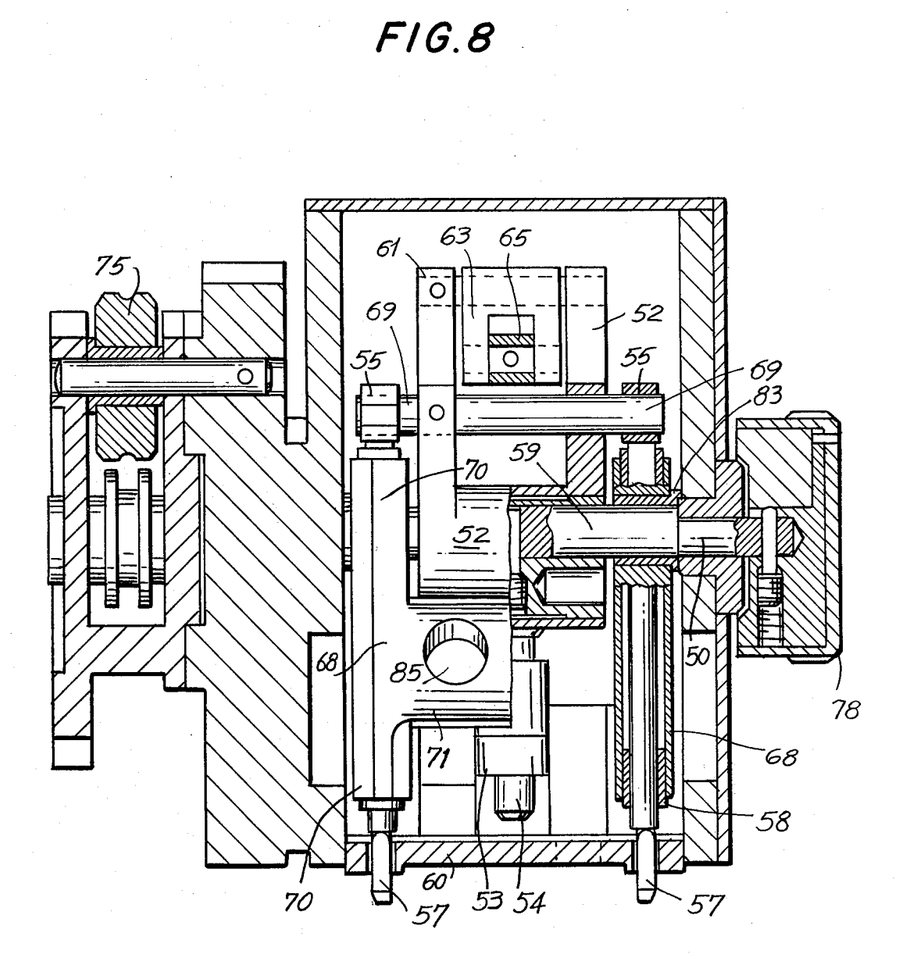
FIG. 8 is a sectional view taken along line VIII—VIII of FIG. 5.
Figure 9:
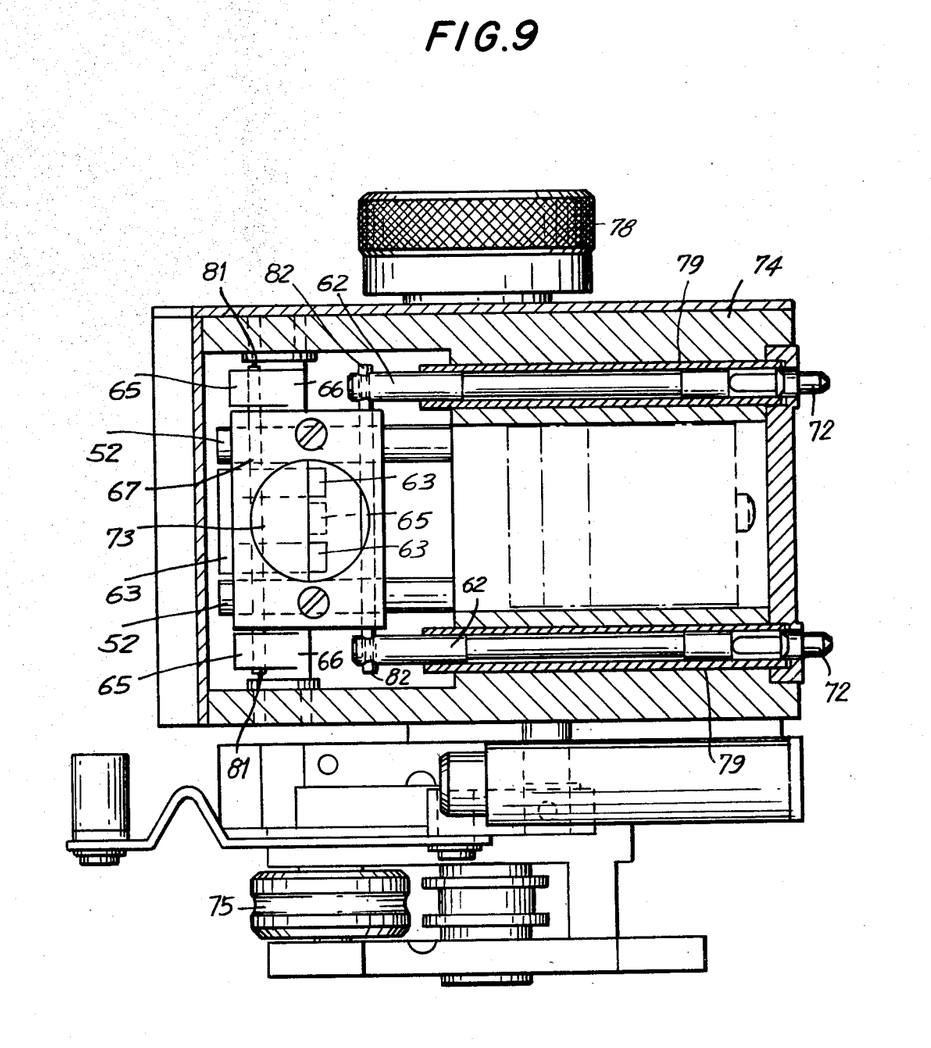
FIG. 9 is a sectional view taken along line IX—IX of FIG. 7.

Eccentric 51, which drives rocker arm 52, is formed from a disc, which can be pushed onto eccentric 59 and screwed thereon as is best illustrated in FIGS. 5 and 7. The eccentricity of eccentric 51 is, with reference to the center line of driving shaft 50, opposite to that of eccentric 59. As aforenoted, the degree of offset is illustrated in FIG. 6 at arrows A and B.

The other end of rocker arm 52 includes a pivot bearing 61 for pivotally coupling piston rod 63 of the pilot system thereto. Piston rod 63 corresponds to piston rod 12 depicted in FIG. 1. A double lever 65 is coupled to the other end of piston rod 63 at pivot bearing 64. Double lever 63 is pivotally coupled to claw feed mechanism housing 74 by means of stationary fulcrum rod 66 about which double lever 65 pivots. The other end of double lever 65 is pivotally coupled to a first end of piston member 67 by means of pivot bearing 81. Piston member 67 can be formed with an opening 73 thereon. Piston member 67 includes a pivot bearing 82 at the other end thereof for allowing the coupling of two single pilot pins 62 thereto. Each single pilot pin 62 along with piston member 67 extend substantially along the entire depth of the film feeder system.

Each single pilot pin 62 is guided in a bearing sleeve 79 of the film feeder system housing 74. Each bearing sleeve 79 includes therein a sliding sleeve 80 for receiving a single pilot pin 62. The other end of each pilot pin 62 includes a film feeder prong 72 for engagement with a perforated opening along the edge of film 9. Openings are provided in film guide plate 60 for allowing prongs 72 of pilot pin 62 to reciprocate therethrough.

The operation of the claw feed mechanism of the instant invention will now be explained. As drive shaft 50 rotates, eccentrics 51 and 59 thereon will similarly be caused to rotate. Eccentric 51, being offset from the central axis of drive shaft 50 will rotate in bearing 90 of rocker arm 52 thereby causing rocker arm 52 to reciprocate and pivot. Film feeder single pins 56 pivotally coupled to rocker arm 52 will similarly be caused to reciprocate and pivot. Film feeder rocker 68 being rotatably coupled to eccentric 59 will also pivot and reciprocate. Since film feeder single pins are slidingly arranged within film feeder rocker 68, they will be caused to reciprocate with respect thereto and will pivot along therewith. Hence, prongs 57 will reciprocate through opening 76 and will engage with perforated openings on the edge of film 9. Film feeder rocker 68 and film feeder single pin 56 therein will be caused to pivot by means of the eccentrics 51 and 59 and will move in a vertical (FIG. 5) direction thereby advancing film 9. Advancing prongs 57 will then withdraw from the perforations in filmstrip 9 through slits 76 thereby leaving filmstrip 9 stationary until drive shaft 50 returns grasping point 57 to its original position for engagement with another perforation, thereby completing one cycle.

Single pilot pins 62 being pivotally coupled to rocker arm 52 by means of driving lever system described above will be caused to horizontally (FIG. 6) reciprocate in horizontal bearing sleeve 79. The system is so arranged that film feeder prong 72 of pilot pin 62 will reciprocate through the slit provided therefore in film guide plate 60 as advancing prong 57 retracts through perforated opening 76 into claw feed mechanism housing 74. Accordingly, prong 72 will engage with other perforated openings along the edge of film 9 and will hold film 9 stationary thereby allowing for proper exposure. As drive shaft 50 rotates, the film will be advanced and held in place intermittently so that proper exposure can occur.

The claw feed mechanism of the instant invention provides an improved mechanism for intermittently advancing the camera film for proper exposure through the photographic optics of the motion picture camera. The film feeding pins and the pilot pins are lighter and smaller than those found in a conventional claw feed mechanism. Accordingly, the claw feed mechanism of the instant invention requires less driving energy than the conventional mechanism. Additionally, since the film feeding pins and pilot holding pins are lighter and smaller, substantially less noise will be produced by the claw feed mechanism than that produced by the conventional mechanism thereby making the incorporation of the claw feed mechanism of the instant invention into a motion picture camera highly desirable.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A claw feed mechanism for a motion picture camera for advancing film for exposure, said film having opposing perforations along the edges thereof, comprising a drive shaft, first and second eccentrics driven by said drive shaft, a first crank driven by said first eccentric, a second crank including a guide driven by said second eccentric and having two openings in alignment with said opposing perforations on said film, first and second film feeder pins pivotally coupled to said first crank and extending through said respective openings in said guide, said first and second film feeder pins each having a prong at the end thereof for engagement with said opposing perforations on said film, the mutual cooperation between said first crank, guide and first and second film feeder pins when driven by said first and second eccentrics acting to reciprocate said prongs into said opposing perforations and to pivot said prongs to advance said film.

2. The claw feed mechanism as claimed in claim 1, wherein said first and second film feeder pins are rotatably secured on a common axis to said first crank.

3. A claw feed mechanism as claimed in claim 1, wherein said film feeding pins are elongated, said openings in said guide being two channels therein for slidingly receiving said elongated film feeding pins so that said film feeding pins reciprocate in said channels in said guide as said film feeding pins and said guide are displaced.

4. A claw feed mechanism as claimed in claims 1 or 3, wherein said first and second eccentrics eccentrically drive said first and second cranks so that the displacement of said prongs define elliptical paths.

5. A claw feed mechanism as claimed in claim 4, wherein said guide includes a sleeve coupled thereto in each said channel of said guide for slidingly receiving said elongated film feeding pins, respectively, for allowing said elongated film feeding pins to reciprocate in said guide.

6. A claw feed mechanism as claimed in claims 1 or 3, further comprising a housing, a third crank having two ends slidingly mounted in said housing for reciprocating motion with respect thereto and coupling means for coupling said second end of said third crank to said first crank so that said first end of said third crank engages with said film when said film feeding pins are substantially disengaged from said film.

7. A claw feed mechanism as claimed in claim 6, wherein said coupling means includes double lever means having two ends, said double lever means being pivotally coupled to said housing intermediate said two ends of said double lever means, a first end of said double lever means being pivotally coupled to said first crank, said second end of said double lever means being pivotally coupled to said second end of said third crank.

8. A claw feed mechanism as claimed in claim 1 or 3, further comprising a housing, said housing including a swiveling guide means pivotally coupled thereto and including a channel therein, said first crank having two ends, a first end of said first crank being slidingly received by said swiveling guide means for reciprocating motion with respect thereto and pivoting motion therewith.

9. A claw feed mechanism as claimed in claim 6, wherein said third crank includes at least two pilot pins slidingly mounted in spaced relation in said housing for engagement with opposing perforations along the edge of said film.

10. A claw feed mechanism as claimed in claim 9, wherein said double lever means includes piston means for coupling said pilot pins to said double lever means, said piston means including at least one perforated opening therein.

* * * * *